United States Patent [19]

Feeney

[11] Patent Number: 5,342,045

[45] Date of Patent: Aug. 30, 1994

[54] REVERSE SUNBURST STRING PATTERN FOR RACQUETBALL RACKETS

[75] Inventor: Brian P. Feeney, Enfield, Conn.

[73] Assignee: LISCO, Inc., Tampa, Fla.

[21] Appl. No.: 169,022

[22] Filed: Dec. 20, 1993

[51] Int. Cl.$^5$ ............................................. A63B 51/00
[52] U.S. Cl. ................................................. 273/73 D
[58] Field of Search .................. 273/73 R, 73 C, 73 D

[56] References Cited

U.S. PATENT DOCUMENTS

| | | | |
|---|---|---|---|
| 1,980,783 | 11/1934 | Cook et al. | 273/73 D |
| 4,231,575 | 11/1980 | Kutt et al. | 273/73 D |
| 4,408,760 | 10/1983 | Ferrari | 273/73 D |
| 4,568,084 | 2/1986 | Mott | 273/73 D |
| 4,684,131 | 8/1987 | Mortvedt | 273/73 D X |
| 4,907,810 | 3/1990 | Whitehead | 273/73 J |

FOREIGN PATENT DOCUMENTS

| | | | |
|---|---|---|---|
| 544572 | 2/1932 | Fed. Rep. of Germany | 273/73 D |
| 2757971 | 6/1979 | Fed. Rep. of Germany | 273/73 D |
| 976198 | 10/1950 | France | 273/73 D |

OTHER PUBLICATIONS

"String Pattern Moves Sweet Spot", *The Sporting Goods Dealer*, 1978 p. 150.

*Primary Examiner*—William E. Stoll

[57] ABSTRACT

A game ball racket with a reverse sunburst string pattern comprising a frame shaped to have its free ends extend parallel to form a handle, with its central extent in a general loop shaped configuration to constitute a head, the frame has an axis centrally disposed through the center of the handle and head, the head is formed with a plurality of spaced apertures extending through its periphery. A first string is positioned through first selected apertures in the head to form cross strings perpendicular to the axis and parallel with each other, the cross strings are spaced from adjacent cross strings a distance greater at the end adjacent the handle than at the opposite end with such spacing decreasing in such direction. A second string is threaded through second selected apertures in the head to form main strings nearly parallel to, but offset from, the axis, each main string is positioned at a small angle with respect to the axis and with the main strings further remote from the center line being at a greater angle than the angle of the strings adjacent to the axis with the angle between adjacent strings increasing with the distance away from the axis, the main strings are spaced more widely apart adjacent to the handle than at the end remote therefrom, the main strings and cross strings constituting a planar string bed.

7 Claims, 4 Drawing Sheets

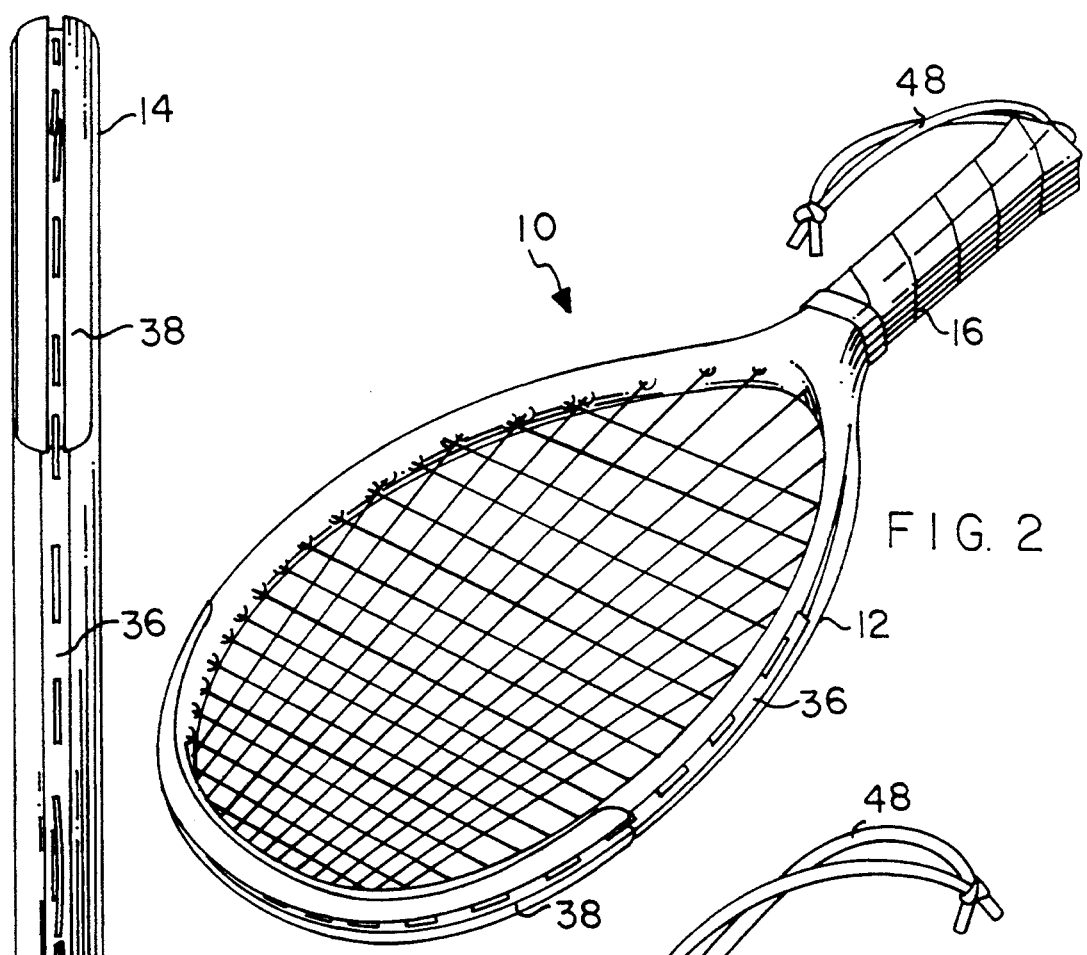
FIG. 2
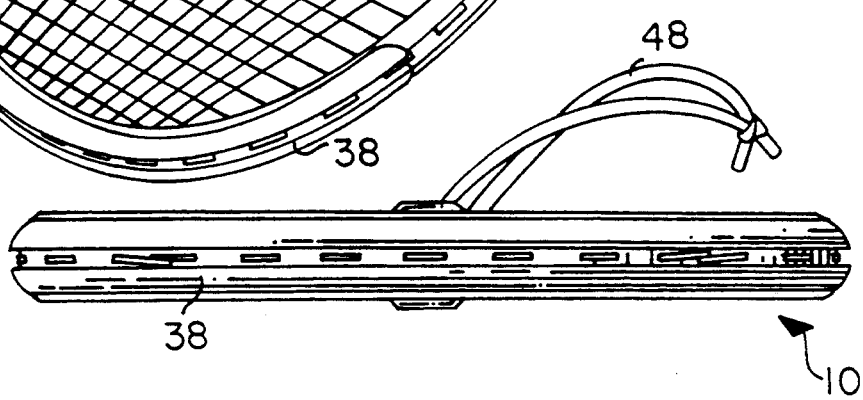
FIG. 4
FIG. 3
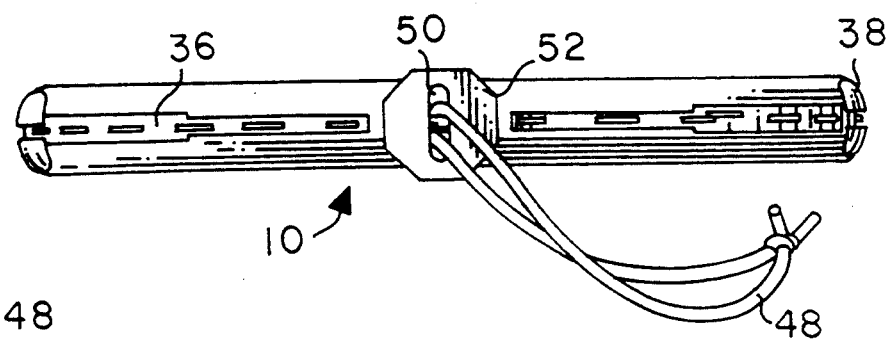
FIG. 5

REVERSE SUNBURST STRING PATTERN FOR RACQUETBALL RACKETS

BACKGROUND OF THE INVENTION

This invention relates to a racquetball racket with a reverse sunburst string pattern and, more particularly, to a string pattern for a game racket frame formed with angled main strings closer together at the top of the head than at the bottom of the head and with parallel cross strings closer together at the top of the head than at the bottom of the head.

DESCRIPTION OF THE BACKGROUND ART

In racquetball, players use rackets to strike a resilient ball against a wall or walls. The racket is constructed of a frame having a handle portion gripped by the player, a looped head portion and an intermediate portion coupling the handle portion and the head portion. Crossed strings are located in the head for striking the ball.

Game rackets including racquetball rackets have been constructed over the years with a large number of string patterns in an effort to improve playing characteristics. By way of example, German Patent Number 544,572 issued in 1932 to Hahn discloses a tennis racket with a string bed having some main strings angled in a starburts manner and with some cross strings at different spacings.

As illustrated by the Hahn patent as well as a great number of commercial rackets as well as other patents, efforts are continuously being made in an attempt to improve rackets including racquetball rackets. Such efforts are made in an effort to render game rackets of ever increasing capabilities during play. None of these previous efforts, however, provides the benefits attendant with the present invention. Additionally, the prior patents and commercial devices do not suggest the present inventive coordination of component elements arranged and configured as disclosed and claimed herein. The present invention achieves its intended purposes, objects and advantages through a new, useful and unobvious combination of component elements, with the use of a minimum number of functioning parts, at a reasonable cost to manufacture and by employing only readily available materials.

Therefore, it is an object of the present invention to provide an improved game ball racket with a reverse sunburst string pattern comprising a frame shaped to have its free ends extend parallel to form a handle, with its central extent in a general loop shaped configuration to constitute a head. The frame has an axis centrally disposed through the center of the handle and head. The head is formed with a plurality of spaced apertures extending through its periphery. A first string is positioned through first selected apertures in the head to form cross strings perpendicular to the axis and parallel with each other. The cross strings are spaced from adjacent cross string a distance greater at the end adjacent the handle than at the opposite end with such spacing decreasing in such direction. A second string is threaded through second selected apertures in the head to form main strings nearly parallel to, but offset from the axis. Each main string is positioned at a small angle with respect to the axis and with the main strings further remote from the center line being at a greater angle than the angle of the strings adjacent to the axis with the angle between adjacent strings increasing with the distance away from the axis. The main strings are spaced more widely apart adjacent to the handle than at the end remote therefrom. The main strings and cross strings constituting a planar string bed.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The invention is defined by the attached claims with the specific embodiments shown in the attached drawings. For the purpose of summarizing this invention, the invention may be incorporated into a new and improved racquetball racket with a reverse sunburst string pattern comprising a frame formed with an oval cross sectional configuration and shaped to have its face ends extend parallel to form a handle. Its central extent is in a general loop shaped configuration to constitute a head and two intermediate portions form angled beams therebetween to couple the handle and head. The frame has an axis centrally disposed through the center of the handle and head. The head is formed with a plurality of spaced apertures extending through its periphery.

A first string is positioned through first selected apertures in the head to form cross strings perpendicular to the axis and parallel with each other. The cross strings are spaced from adjacent cross strings a distance greater at the end adjacent to the handle than at the opposite end with the string spacing decreasing in such direction.

A second string is threaded through second selected apertures in the head to form main strings nearly parallel to, but offset from, the axis. Each main string is positioned at a small angle with respect to the axis and with the main strings further remote from the center line being at a successively greater angle than the angle of the strings adjacent to the axis with the angle between adjacent strings increasing with the distance away from the axis. The main strings are spaced more widely apart adjacent to the handle than at the end remote therefrom. The main strings and cross strings constitute a planar string bed.

A bumper strip is located on the radially exterior surface of the head at the end thereof remote from the handle.

Grommet strips are located on the radially exterior surface of the frame on opposite sides thereof.

A pallet is formed on the ends of the frame at the handle to facilitate proper sizing at the discretion of the user and with a spiral wrap grip thereover and with a butt-cap thereover.

A tie string is secured to the handle at its end thereof and with an aperture in the butt-cap for the passage of the tie string therethrough.

The foregoing has outlined rather broadly the more pertinent and important features of the present invention. The detailed description of the invention that follows is offered so that the present contribution to the art may be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a more succinct understanding of the nature and objects of the invention, reference should be directed to the following description taken in conjunction with the accompanying drawings in which:

FIG. 2 is a perspective illustration of a racquetball racket shown in FIG. 1.

FIGS. 3, 4 and 5 are side, top and bottom elevational views of the racket of the prior Figures.

Similar reference characters refer to similar parts throughout the several views of the drawings.

DETAILED DESCRIPTION OF THE PREFERRED EMBODIMENT

Figure 1:
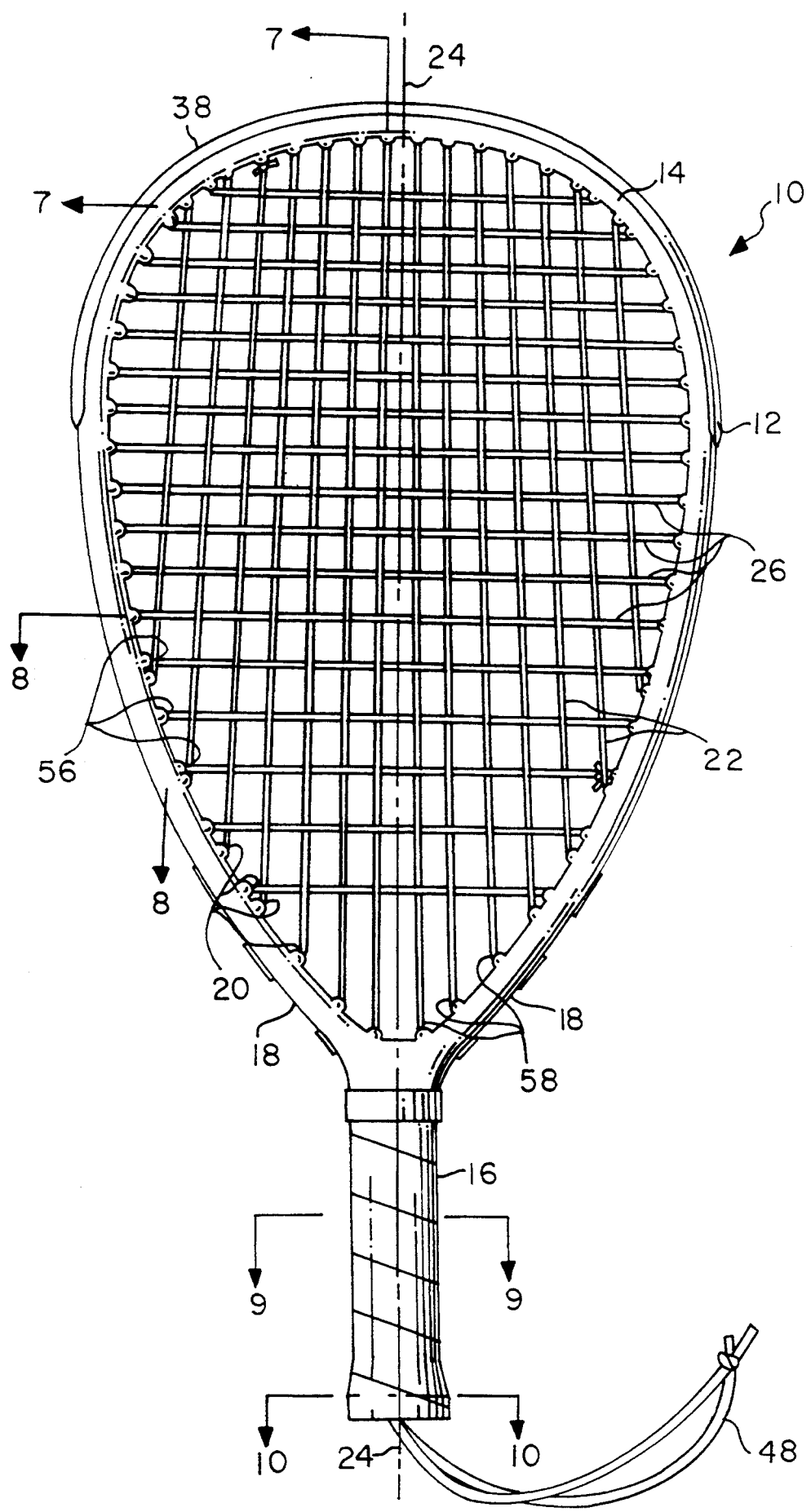
FIG. 1 is a front elevational view of a racquetball racket with a frame and string pattern constructed in accordance with the principles of the present invention.
Figure 6:
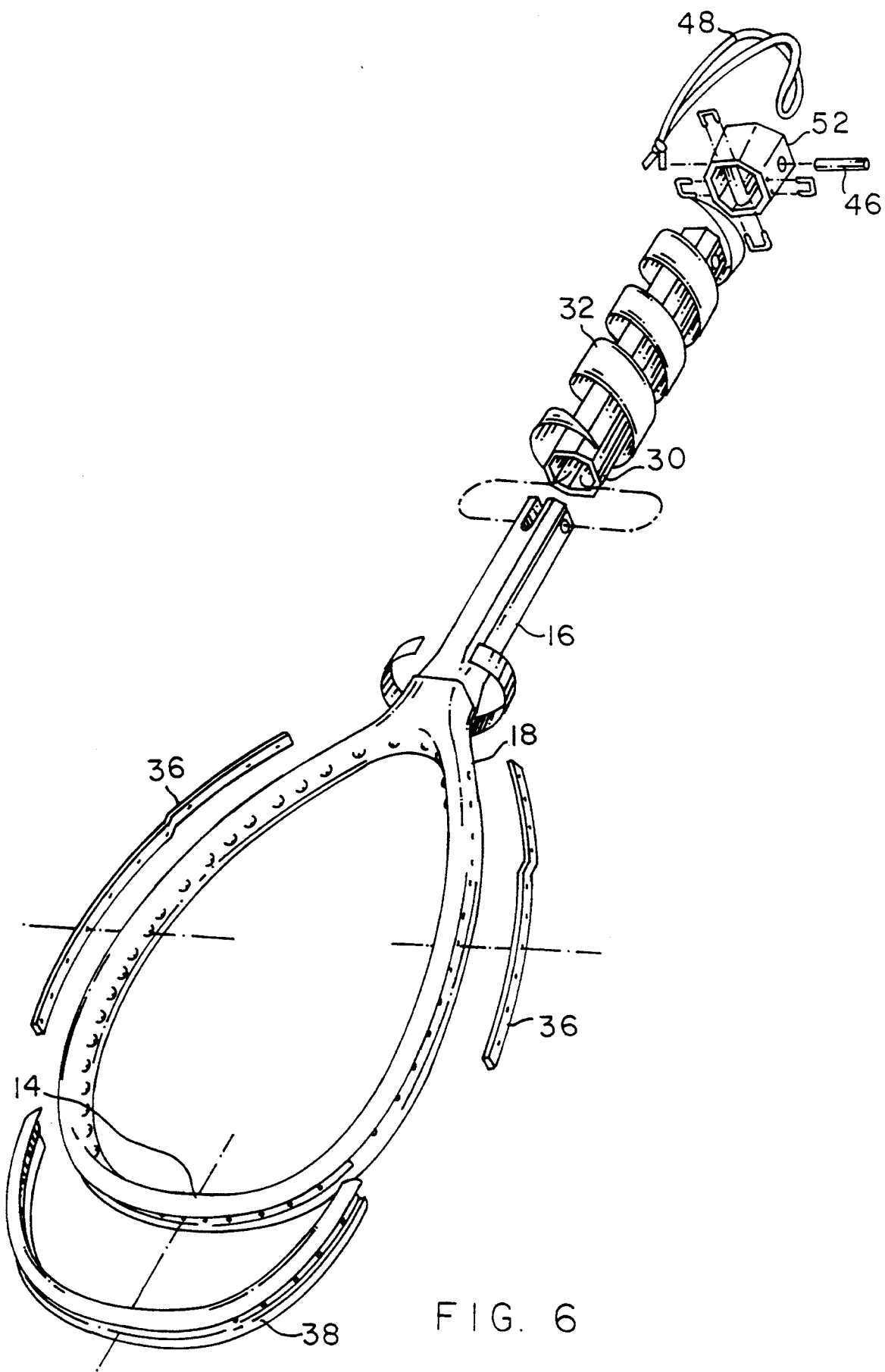
FIG. 6 is an exploded perspective view of the racket of the prior Figures.
Figure 7:
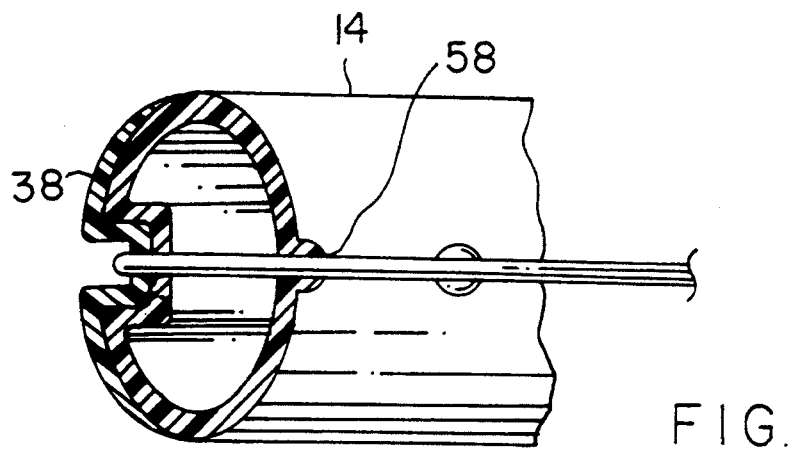
FIGS. 7 through 11 are sectional views of the racket taken along lines 7—7, 8—8, 9—9, 10—10 and 11—11 of FIGS. 1 and 10.
Figure 8:
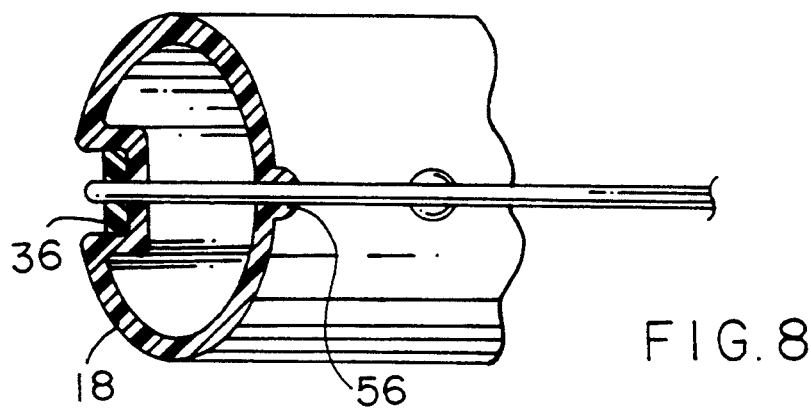
Figure 9:
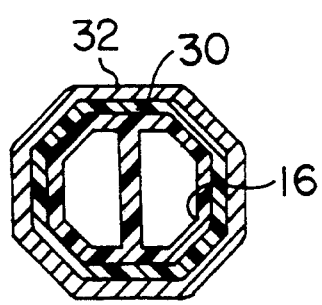
Figure 10:
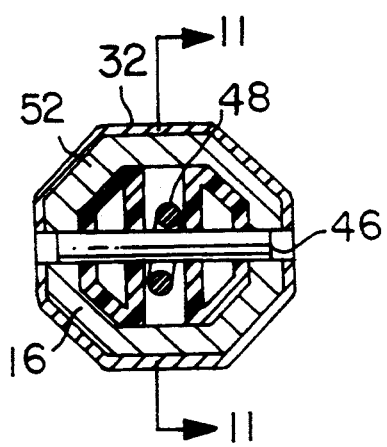
Figure 11:
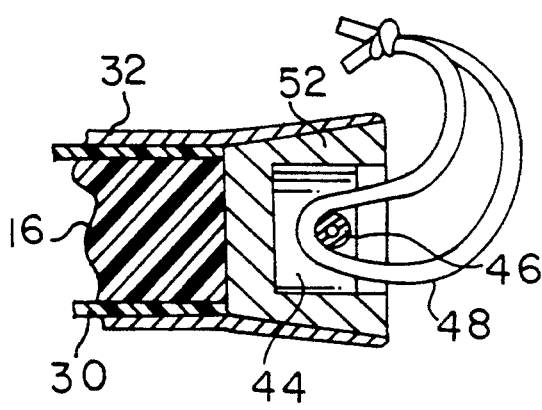

With particular reference to the Figures, there are shown in FIGS. 1 through 6 various illustrations of a racquetball racket 10 constructed in accordance with the principles of the present invention. The major component of the tennis racket 10 is the frame 12. The frame is preferably of a composite construction, constructed in a tubular configuration of graphite filaments in an epoxy resin matrix. The frame 12 is shaped in an oval configuration at the head 14 and with the tube in parallel, side-by-side relationship at the handle 16. Therebetween, the frame has an intermediate portion at the bottom of the head in the nature of beams 18 coupling the head 14 and the handle 16 and completing the loop for the string bed.

The other principal components of the racket are the strings which are essentially interwoven through holes 20 in the periphery of the frame. Main or vertical strings 22 extend slightly offset from the parallel with the central axis 24 of the frame and racket. Minor or cross horizontal strings 26 are strung in the head perpendicular to the central axis and are interwoven through the vertical strings. Together the strings lie in a plane to form the string bed which constitutes a striking surface for hitting the ball during play. The strings extend through small holes or apertures around the entire periphery of the head. The main strings are formed from a common first string extending through hole pairs while the minor strings are formed from a common second string extending through other hole pairs.

Another component of the racket is the handle 16. The handle is fabricated of a pallet 30 or underlisting on the frame made of a hard or soft polyurethane which is then covered by spirally wrapping leather or synthetic grip 32 thereover. Weights, as of lead, may be added to the handle portion of the frame beneath the pallet for balancing purposes. Such components are conventional in the art.

The head end of the frame is provided with grommet strips 36 and a bumper strip 38. The grommet strips 36 are a moldable, hard, synthetic material such as nylon on the radial exterior of the head at the sides of the racket. The bumper strip 38 is also of a similar material and extends radially exterior of the head at the top of the head and racket. It extends axially a greater distance than the grommet strip to preclude scraping the frame. The grommet strips and bumper strips are foraged with hollow tubular barrels extending through associated head holes 20 through which the strings pass. Such components are conventional in the racquetball racket art.

At the but end of the frame, a recess 44 is foraged in the pallet 30. A cross bar 46 extends across the recess with its ends secured to the ends of the frame 12. A string 48 is looped around the bar and extends through a hole 50 in the but cap 52. This again is a conventional feature.

In the preferred embodiment, the cross strings are all parallel with each other extending from one side of the head to the other. The cross strings closest to the handle are more widely spaced then the strings adjacent to the top or remote end of the head. The strings are spaced more closely to its next adjacent string when measured from the handle end. In the preferred embodiment, seventeen cross strings are employed. The spacing between the two strings closest to the handle end is 26.5 millimeters. The spacing between the strings most remote from the handle is 13.4 millimeters. Adjacent strings therebetween are either equally spaced or spaced more closely then the string on the side thereof closer to the handle.

In the preferred embodiment, fourteen main strings are employed. Seven are located on each side of the central axis. The two strings adjacent to the center line are each spaced equally and oppositely at about 0.5 degrees from the vertical center line. The strings most remote from the vertical center line are each at about 5.0 degrees from the vertical center line. The main strings closest to the axis are more widely spaced from the axis at the bottom end closer to the handle at 16 millimeters and more closely spaced at the top end remote from the handle at 12 millimeters The string bed has an overall length of 14¼ and width of 9¼ at its greatest extent.

As a result, the holes in the sides of the frame are arranged in pairs. The holes of each pair are in axial alignment. The pairs are more widely spaced from adjacent pairs adjacent to the handle end and more closely spaced adjacent to the top end.

The invention may also be considered as being directed to a frame for use in supporting strings to constitute a game racket, preferably a racquetball racket. Such frame is as described above with holes 20 also as described above. The holes include a first set of string holes 56 arranged in pairs, the holes of the pairs being on opposite lateral sides of the frame. Such holes are positioned to support the cross strings perpendicular to the axis and parallel to each other. The hole pairs are spaced from adjacent hole pairs a distance greater at the bottom end adjacent to the handle than at the top or opposite end. Such spacing decreases in such direction away from the handle. In some instances, central cross strings may be parallel and equally spaced with the same benefits accruing as if they were continually decreasing in such direction.

Also included is a second set of string holes 58. Such second set of string holes are arranged in pairs at upper and lower sections of the frame. They are positioned to support the main strings nearly parallel to, but offset from, the axis. Each main string and, consequently, its associated hole pairs is configured and positioned to hold its string at a small angle with respect to the axis. This is done with the holes 58 further remote from the center line supporting their strings at an angle greater than the angle of the holes adjacent to the axis. The angle between adjacent strings and their supporting holes thereby increases with the distance away from the axis. The holes are spaced more widely apart adjacent to the handle or bottom end of the frame than at the top end or end remote therefrom.

In racquetball the object of the game is to hit the ball off of the front wall, either directly or indirectly, before the ball bounces twice. Therefore, a good offensive shot is one that hits the front wall as close to the bottom as possible and takes two quick bounces well before the opponent has a chance to keep the ball in play. An ideal shot is one that hits the front wall and basically rolls back to the opponent. This shot is referred to as a "roll-out."

Unlike tennis where the player typically attempts to strike the ball at a point that is about waist high and positioned in the center of the string bed, superior racquetball shots are achieved by letting the ball drop to a point somewhere between the bottom of the knee and the floor and making impact with the ball at a position towards the center of the top end of the racket. This position is referred to as the "target zone." To assure impact with the ball at the proper height, most players will allow the head of the racquet to dip towards the floor and hit the ball towards the top end of the racket. Letting the head dip below horizontal and making contact near the top makes it easier to hit the front wall at a lower point. Since the racket is traveling in a generally radial path, the top end of the racket is traveling at the fastest speed. The faster the speed of the racket, the faster the ball will rebound off the racket and more powerful the shot. The combination of power and being able to hit the ball lower, leads to most of the players attempting to hit the ball consistently towards the top of the head of a racket.

In terms of power and control there are opposing theories on the benefits and drawbacks of an open or dense string pattern in a racket. In racquetball, it is believed that a more open string pattern delivers the maximum power, without sacrificing any significant amount of control. This disadvantage of an open string pattern is that because fewer strings are making impact with the ball, these strings are bearing a higher load and will tend to fail earlier as compared to a more dense string pattern.

Currently, the most common design used for the string bed of racquetball rackets follow the basic design used in tennis rackets. Such design places the maximum string density near the center of the racket. This is achieved by varying the distance between each string. As measured moving away from the center of the racket, the distance between each successive cross or main string will increase. There is a variation of this pattern referred to as the "sunburst" pattern where the main strings are angled slightly outward, meaning that the distance between two main strings will be larger at the top than at the bottom of the frame. For racquetball rackets, neither the standard nor the "sunburst" string pattern are optimal string patterns. They tend to lead to premature failure of the strings because the ball is most often making impact with the string bed in the target zone where the density of the strings is low. The density of the string bed in the center portion of the racket is too high and results in less than optimum power from the racket.

The string patter of the present invention is referred to as the "reverse sunburst" pattern. It provides an optimized balance between power resulting from a lower density string bed and durability resulting from the placement of the maximum density of the strings in the target zone. The present design simply places the maximum string density at the top center of the racket and has the density continuously decrease as measured away from both the center and the top of the frame. The distance between the cross strings increases as measured away from the top of the head. The distance between the main strings increases as we measured from the centerline of the racket and these strings are angled inward towards the top of the racket. The distance between main string will thus be smaller at the top than at the bottom of the frame.

The "reverse sunburst" pattern puts the maximum string density at the top of the racket, where the speed of the racket is already at a maximum. This means a shot hit in this target location of the racket will have power due to the speed of the racket, and it will have maximum control due to the density of the strings. A ball that impacts the string bed away from this target zone is referred to a miss hit. A miss hit ball will impact with the racket at a position on the racket with a lower racket speed. Therefore, by decreasing the string density, more power will be transferred to the ball. By nature, a miss hit ball will be more difficult to control, but this string patter will also further decrease the control by the player. Most players would gladly exchange power for control, especially on balls that are miss hits.

The "reverse sunburst" patter of the present invention provides optimum performance for a racquetball racket by reducing string breakage, increasing control on well hit shots and increasing power on miss hit shots.

The present disclosure includes that contained in the appended claims as well as that of the foregoing description. Although this invention has been described in its preferred form with a certain degree of particularity, it should be understood that the present disclosure of the preferred form has been made only by way of example and that numerous changes in the details of construction and combination and arrangement of parts may be resorted to without departing from the spirit and scope of the invention.

Now that the invention has been described,

What is claimed is:

1. A new and improved racquetball racket with a reverse sunburst string pattern comprising, in combination:

a frame formed with an oval cross sectional configuration and shaped to have its free ends extend parallel to form a handle, with its central extent in a general loop shaped configuration to constitute a head and two intermediate portions forming angled beams therebetween to couple the handle and head, the frame having an axis centrally disposed through the center of the handle and head, the head being formed with a plurality of spaced apertures extending through its periphery;

a first string positioned through first selected apertures in the head to form cross strings perpendicular to the axis and parallel with each other, the cross strings being spaced from adjacent cross strings a distance greater at the end adjacent the handle than at the opposite end with such spacing decreasing with distance away from the handle in such direction;

a second string threaded through second selected apertures in the head to form main strings nearly parallel to, but offset from, the axis, each main string being positioned at a small angle with respect to the axis and with the main strings further remote from the center line being at a successively greater angle than the angle of the strings adjacent to the axis with the angle between adjacent strings increasing with the distance away from the axis, the main strings being spaced more widely apart adjacent to the handle than at the end remote therefrom, the main strings and cross strings constituting a planar string bed;

a bumper strip located on the radially exterior surface of the head at the end thereof remote from the handle;

grommet strips located on the radially exterior surface of the frame on opposite sides thereof;

a pallet formed on the ends of the frame at the handle to facilitate proper sizing at the discretion of the user and with a spiral wrap grip thereover and with a butt cap thereover; and a tie string secured to the handle at its end thereof and with an aperture in the butt cap for the passage of the tie string therethrough.

2. A game ball racket with a reverse sunburst string pattern comprising:

a frame shaped to have its face ends extend parallel to form a handle, with its central extent in a general loop shaped configuration to constitute a head, the frame having an axis centrally disposed through the center of the handle and head, the head being formed with a plurality of spaced apertures extending through its periphery;

a first string positioned through first selected apertures in the head to form cross strings perpendicular to the axis and parallel with each other, the cross strings being spaced from adjacent cross strings a distance greater at the end adjacent to the handle than at the opposite end with the string spacing decreasing with distance away from the handle in such direction; and a second string threaded through second selected apertures in the head to form main strings nearly parallel to, but offset from, the axis, each main string being positioned at a small angle with respect to the axis and with the main strings further remote from the center line being at a greater angle than the angle of the strings adjacent to the axis with the angle between adjacent strings increasing with the distance away from the axis, the main strings being spaced more widely apart adjacent to the handle than at the end remote therefrom, the main strings and cross strings constituting a planar string bed.

3. The racket as set forth in claim 2 wherein the spacing between the cross strings closest to the handle is 26.5 millimeters and the spacing between the cross strings furthest from the handle is 13.4 millimeters.

4. The racket as set forth in claim 2 wherein spacing between the main strings closest to the axis is 16 millimeters at their ends closest to the handle and 12 millimeters at their ends furthest from the handle.

5. The racket as set forth in claim 2 wherein the angle from the axis is 0.5 degrees for the strings closest to the axis and 5.0 degrees for the strings furthest from the axis.

6. A game ball racket frame for a reverse sunburst string pattern comprising:

a frame shaped to have its free ends extend parallel to form a handle, with its central extent in a general loop shaped configuration to constitute a head, the frame having an axis centrally disposed through the center of the handle and head, the head being formed with a plurality of spaced apertures extending through its periphery;

a first set of string holes arranged in pairs and positioned to support cross strings perpendicular to the axis and parallel with each other, the hole pairs being spaced from adjacent hole pairs a distance greater at the end adjacent the handle than at the opposite end with the spacing between hole pairs decreasing with distance from the handle in such direction; and a second set of string holes arranged in pairs and positioned to support main strings nearly parallel to, but offset from, the axis, with each main string being positioned at a small angle with respect to the axis and with the main strings further remote from the center line being at a greater angle than the angle of the strings adjacent to the axis with the angle between adjacent strings increasing with the distance away from the axis, the holes supporting the main strings being spaced more widely apart adjacent to the handle then at the end remote therefrom.

7. The frame as set forth in claim 6 wherein such frame is fabricated of a composite material.

* * * * *